US008047062B2

(12) United States Patent
Lehnert

(10) Patent No.: US 8,047,062 B2
(45) Date of Patent: Nov. 1, 2011

(54) TESTING DEVICE FOR HIGH PRESSURE INJECTORS OF A COMMON RAIL INJECTION SYSTEM, AND METHOD FOR TESTING HIGH PRESSURE INJECTORS

(76) Inventor: Friedrich Lehnert, Neuenstadt (DE)

(*) Notice: Subject to any disclaimer, the term of this patent is extended or adjusted under 35 U.S.C. 154(b) by 76 days.

(21) Appl. No.: 11/989,741

(22) PCT Filed: Jan. 12, 2006

(86) PCT No.: PCT/DE2006/000032
§ 371 (c)(1),
(2), (4) Date: Mar. 18, 2008

(87) PCT Pub. No.: WO2007/012298
PCT Pub. Date: Feb. 1, 2007

(65) Prior Publication Data

US 2009/0114035 A1 May 7, 2009

(30) Foreign Application Priority Data

Jul. 28, 2005 (DE) ..................... 20 2005 011 855 U

(51) Int. Cl.
*G01M 15/04* (2006.01)

(52) U.S. Cl. ................ 73/114.48; 73/114.42; 73/114.43

(58) Field of Classification Search ............... 73/114.42, 73/114.43, 114.48
See application file for complete search history.

(56) References Cited

U.S. PATENT DOCUMENTS

| | | | | | |
|---|---|---|---|---|---|
| 4,788,858 | A | * | 12/1988 | Liebermann | 73/114.48 |
| 4,977,872 | A | * | 12/1990 | Hartopp | 123/198 A |
| 4,977,873 | A | * | 12/1990 | Cherry et al. | 123/267 |
| 5,020,362 | A | * | 6/1991 | Hart et al. | 73/114.43 |
| 5,117,683 | A | * | 6/1992 | Phillips | 73/114.38 |
| 5,187,974 | A | * | 2/1993 | Mellits et al. | 73/49.7 |
| 5,357,792 | A | * | 10/1994 | Getenby | 73/114.43 |
| 5,616,837 | A | * | 4/1997 | Leonard et al. | 73/114.43 |
| 6,234,002 | B1 | * | 5/2001 | Sisney et al. | 73/1.57 |
| 7,228,729 | B1 | * | 6/2007 | Krassinger et al. | 73/114.42 |
| 7,587,931 | B2 | * | 9/2009 | Krassinger et al. | 73/114.42 |

FOREIGN PATENT DOCUMENTS

| | | | |
|---|---|---|---|
| DE | 202004000922 | U1 | 3/2004 |
| EP | 0364167 | A | 4/1990 |

* cited by examiner

*Primary Examiner* — Freddie Kirkland, III
(74) *Attorney, Agent, or Firm* — Leason Ellis LLP.

(57) ABSTRACT

A testing device (10) for high-pressure injectors (50) of a common rail injection system of an engine unit, with the high-pressure injectors (50) each having a fuel return connection (52) for a fuel return line (54) is characterized by a throughflow quantity measuring/display unit (12) which can be detachably connected between the fuel return connection (52) and fuel return line (54).

10 Claims, 6 Drawing Sheets

TESTING DEVICE FOR HIGH PRESSURE INJECTORS OF A COMMON RAIL INJECTION SYSTEM, AND METHOD FOR TESTING HIGH PRESSURE INJECTORS

CROSS-REFERENCE TO PRIOR APPLICATION

This is a U.S. National Phase application under 35 U.S.C. §371 of International Application No. PCT/DE2006/000032, filed Jan. 12, 2006, which claims the benefit of German Patent Application No. 20 2005 011 855.9, filed Jul. 28, 2005, both of which are incorporated herein by reference. The International Application was published in German on Feb. 1, 2007 as WO 2007/012298 A1 under PCT Article 21 (2).

TECHNICAL FIELD

The present invention relates to a testing device for high-pressure injectors of a common rail injection system of an engine unit, with the high-pressure injectors each having a fuel return connection for a fuel return line.

One possible source of malfunction in a common rail injection system can be a defective high-pressure injector. It must be possible for such sources of malfunction to be diagnosed by motor vehicle workshops. The source of malfunction or the faulty high-pressure injector can be identified by comparing the fuel return quantity of the individual cylinders of an engine unit with one another according to manufacturer specifications at idle or at corresponding rotational speeds.

The efficiency of a high-pressure injector can also be adversely affected in that the injection nozzle is faulty. Cleaning methods for contaminated high-pressure injectors are known. It is however not possible to immediately and quickly test the efficiency of the cleaning process or its effectiveness.

PRIOR ART

In the case of high-pressure injectors of a common rail injection system, it is known within the context of fault diagnosis to test the fuel return quantity using a test tube. For this purpose, the connections of the fuel return line are removed from the injectors and replaced by a Plexiglas tube with original plug connections. Here, the Plexiglas tube is plugged onto the fuel return line connection of the injector in a simple manner from above. In some cases, it is not possible for the test tube to be plugged on, since there is insufficient space available in the upward direction in the engine bay. Depending on the respective manufacturer, however, high-pressure injectors are also used whose connections for the fuel return line are arranged laterally. As a result, it is not possible for the known test tube to be plugged on in a simple manner. In the case of injectors from the company Siemens, the return line is seated laterally on the nozzle. In the case of injectors from the company Delphi, only a laterally upwardly pointing spout is available. In some cases, the test tube must have a relatively large volume since, according to manufacturer specifications, the engines must in part run at idle and at corresponding rotational speeds for approximately 1 to 3 minutes, and a large amount of fuel is correspondingly returned. Even in the event of any defect of an injector nozzle, a significantly larger fuel quantity flows back.

PRESENTATION OF THE INVENTION

Proceeding from the cited prior art, the present invention is based on the object or the technical problem of specifying a testing device and a method of the type specified in the introduction which permits reliable fault diagnosis, in particular by means of which the testing of the efficiency of a cleaning process is easily possible, and which can be used in a simple manner in the widest variety of engines.

The testing device according to the invention is defined by the features of independent claim 1. Advantageous embodiments and refinements are specified in the claims which are directly or indirectly dependent on independent claim 1.

The method according to the invention is defined by the features of independent claim 9. Advantageous embodiments and refinements are specified in the claims which are directly or indirectly dependent on independent claim 9.

The testing device according to the invention is accordingly characterized by a throughflow quantity measuring/display unit which can be detachably connected between the fuel return connection and fuel return line.

It is advantageously possible with the testing device according to the invention to measure the defectiveness within an overall circuit system of high-pressure injectors. For this purpose, the individual high-pressure injectors of an engine are checked with one another by means of the testing device with regard to the return flow quantity of the fuel in the fuel return line. If a high-pressure injector falls out of line with regard to the return flow quantity, then it can be concluded on account of the values of the other high-pressure injectors that said high-pressure injector is defective or, in a first step, should initially be cleaned. Here, the circuit of the fuel is closed, thereby creating the possibility of operating the engine over a relatively long time period for testing purposes, and for observing or documenting any changes in the fuel return flow.

With the testing device according to the invention, it is likewise possible in a simple manner to test the efficiency of a cleaning process. The throughflow quantity measuring/display unit is firstly mounted, and the throughflow quantity is measured. The cleaning process is then carried out. The return flow is then measured once again by means of the throughflow quantity measuring/display unit. If the cleaning process was successful, a uniform return flow quantity of fuel is exhibited. If the return flow quantities do not change or change only an insignificant amount at an injector, it can be concluded that the high-pressure injector has a defect which cannot be eliminated by cleaning processes.

One particularly preferred embodiment is characterized in that a first, in particular flexible hose unit is arranged between the fuel return connection and the throughflow quantity measuring/display unit. Here, it is possible according to a further advantageous embodiment for a second, in particular flexible hose unit to be arranged between the throughflow quantity measuring/display unit and the fuel return line.

As a result of the provision of flexible hose units upstream and/or downstream of the throughflow quantity measuring/display unit, it is possible for the testing device to be easily used even in the case of restricted spatial conditions within the respective engine unit. It is also conceivable for a separate display unit to be provided which communicates with the throughflow quantity measuring/display unit.

The display unit can preferably be embodied as a digital or pointer unit.

A particularly structurally simple, economically producible and permanently reliable testing device is characterized in that the throughflow quantity measuring/display unit is embodied as a transparent hollow profile with a floating body arranged at the inside so as to be movable in the longitudinal direction of the hollow profile. The hollow profile can preferably be composed of glass or plastic.

According to one advantageous embodiment, a readable scale is also provided on the hollow profile.

The fuel return flow quantity which flows via the fuel return connection and the throughflow quantity measuring/display unit back into the fuel tank causes the floating body within the hollow profile to float up to a different extent depending on size. It is thereby possible to read off the throughflow quantity in a simple manner, in particular if a mounted scale is present. Said embodiment is technically robust and suitable for use in rough workshop conditions. Reliable results are also displayed.

The method according to the invention for testing the functionality of high-pressure injectors of a common rail injection system of an engine unit is accordingly characterized in that, for a predefinable time interval, a throughflow quantity measuring/display unit is detachably inserted between the fuel return connection of the high-pressure fuel injector and the fuel return line, and the engine unit is subsequently operated over predefinable time intervals, so that the quantity of returning fuel is measured and/or displayed.

A particularly advantageous embodiment of the method according to the invention with regard to handling is characterized in that an in particular flexible hose unit is detachably connected in order to produce a communicative connection between the fuel return connection of the high-pressure injector and the throughflow quantity measuring/display unit and/or between the throughflow quantity measuring/display unit and the fuel return line.

In order to be able to test the functionality of all of the high-pressure injectors in comparison with one another in a simple manner, a particularly advantageous refinement is characterized in that in each case one throughflow quantity measuring/display unit is used within the predefinable time interval for each high-pressure injector of the engine unit.

In order to document the efficiency of a cleaning process which is carried out, one particularly advantageous embodiment of the method according to the invention is characterized in that the throughflow quantity measuring/display unit is used in a first time interval, the high-pressure injectors are subsequently subjected to a cleaning process, and then the throughflow quantity measuring/display unit is used in a second time interval.

Further embodiments and advantages of the invention can be gathered from the further features listed in the claims and from the exemplary embodiment specified below. The features of the claims can be combined with one another in any desired way as long as said features are not obviously mutually exclusive.

BRIEF DESCRIPTION OF THE DRAWING

The invention and advantageous embodiments and refinements thereof are described and explained in more detail below on the basis of the example illustrated in the drawing. The features which can be gathered from the description and the drawing can be applied according to the invention individually or together in any desired combination. In the drawing.

WAYS OF IMPLEMENTING THE INVENTION

Figure 2:
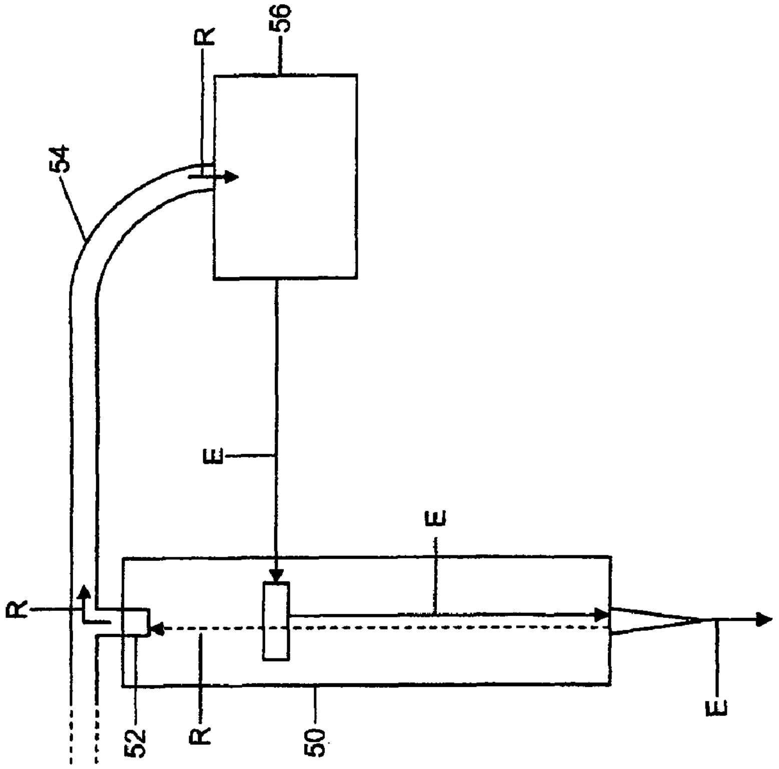
FIG. 2 shows a highly schematized illustration of the high-pressure injector without a testing device and with a fuel return line connected.

FIG. 2 shows, in highly schematized form, the fuel flow conditions in a high-pressure injector of a common rail injection system of an engine unit (not illustrated in any more detail).

Fuel is supplied from a fuel tank 56 to a high-pressure injector 50. All the control, regulation and feed fixtures are not illustrated in the figures. The flow direction of the fuel to the injection point is illustrated in the figures by arrows E.

Within the high-pressure injector 50, the supplied fuel is conducted up to the injection nozzle, and parts of the fuel which are not required flow back. If the injection nozzle or the high-pressure injector 50 is defective or contaminated, a greatly increased fuel quantity flows back via a fuel return connection 52 of the high-pressure injector 50 and via a connected fuel return line 54 into the fuel tank 56. The return flow of the fuel is illustrated in the figures by arrows R.

Figure 1:
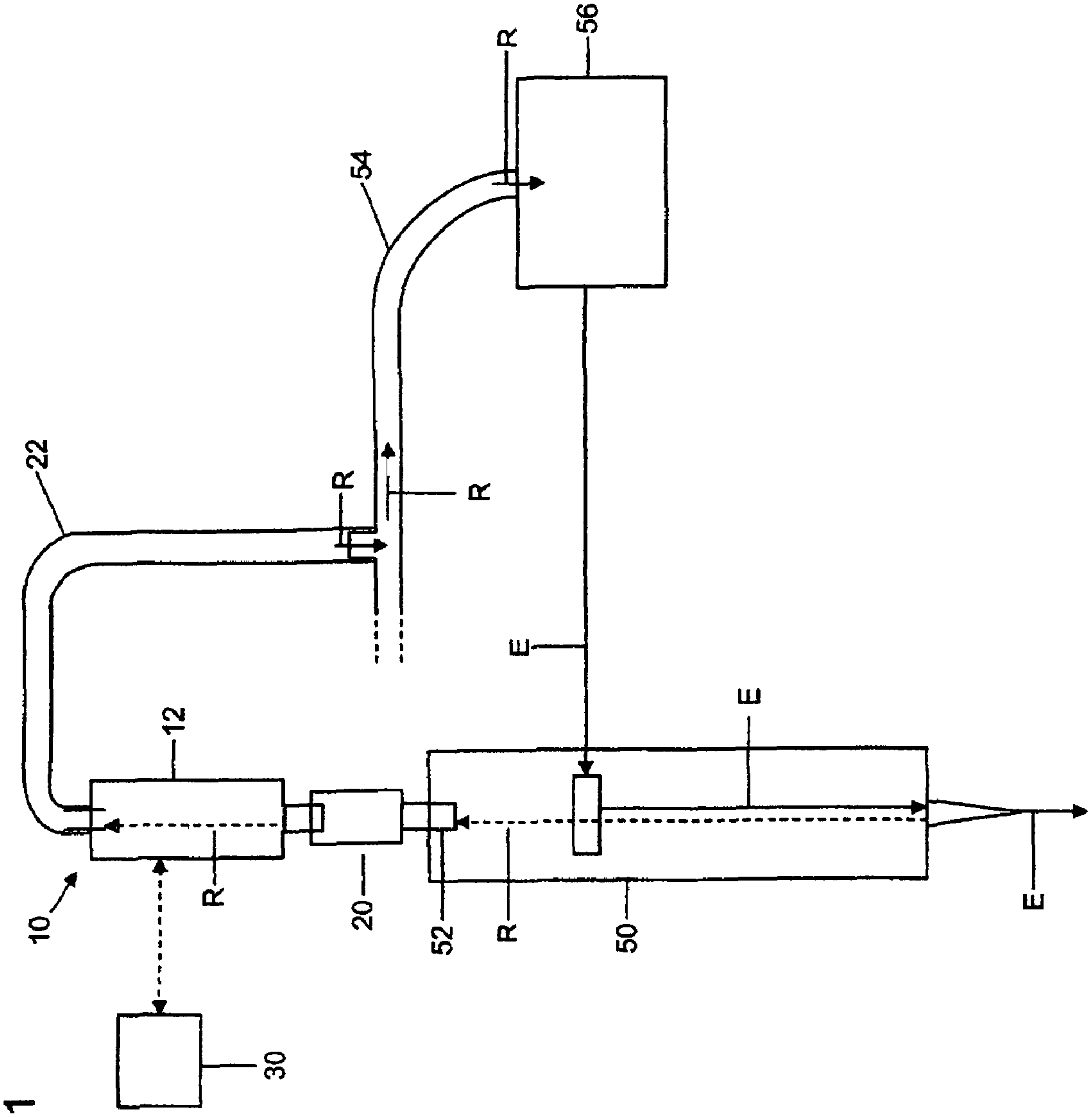
FIG. 1 shows a highly schematized illustration of the use of a testing device with a throughflow quantity measuring/display unit for a high-pressure injector of a common rail injection system.

In order to test whether the high-pressure injector 50 is defective or whether a cleaning process which has taken place previously has resulted in improvements, according to FIG. 1, a testing device 10 is used which has a throughflow quantity measuring/display unit 12. In a first step, the fuel return line 54 is released from the fuel return connection 52. A connection between the fuel return connection 52 and the throughflow quantity measuring/display unit 12 is subsequently produced by means of a first flexible hose unit 20. In addition, the throughflow quantity measuring/display unit 12 is connected by means of a second flexible hose unit 22 to the return line 54. During operation of the high-pressure injector 50, it is now possible for the fuel return flow quantity to be determined and displayed by means of the throughflow quantity measuring/display unit 12. If the throughflow quantity measurement is carried out before and after a cleaning process of the high-pressure injector 50, then it is possible by means of the display to determine whether the cleaning process was successful or whether another defect is present.

It is also possible to connect a separate evaluating unit 30 to the throughflow quantity measuring/display unit 12, which separate evaluating unit 30 compares and evaluates the measured actual throughflow quantity for example with stored nominal throughflow quantities.

Once the measuring process has ended, the first hose unit 20 is detached from the fuel return connection 52 and the second hose unit 22 is detached from the fuel return line 54. The fuel return line 54 is subsequently connected again via the fuel return connection 52 to the high-pressure injector 50.

Figure 3:
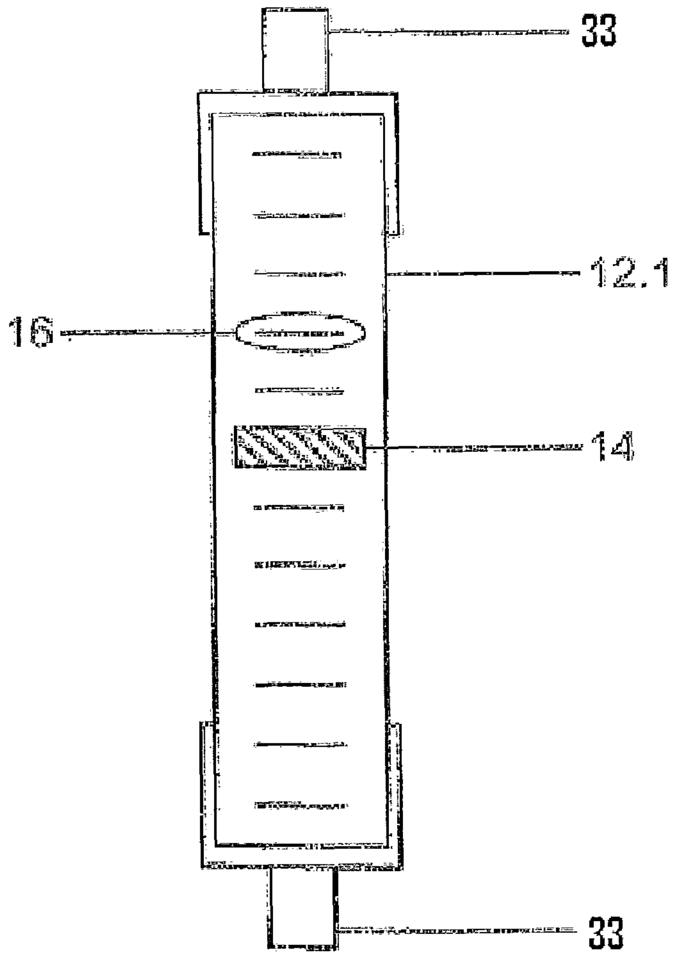
FIG. 3 shows a highly schematized illustration of one structural embodiment of a throughflow quantity measuring/display unit, embodied as a glass tube with a plastic floating body.

One structural embodiment of the throughflow quantity measuring/display unit 12 is schematically illustrated in FIG. 3. Said unit 12.1 is embodied as a glass tube which has, at the upper side and lower side, connecting units 33 for the first hose unit 20 and second hose unit 22 respectively, with a floating body unit 14 being provided within the unit 12.1, which floating body unit 14 is mounted so as to be longitudinally movable within the unit 12 and assumes different positions depending on the throughflow quantity. In addition, the unit 12.1 has a readable scale 16, by means of which the order of magnitude of the throughflow quantity can be specified. Said embodiment provides a testing device which can be produced in an economically favorable manner, can be used easily and ensures a permanently reliable function even under robust workshop conditions.

FIG. 4 shows, in a highly schematized fashion, the four high-pressure injectors 50 of a 4-cylinder unit, to which high-pressure injectors 50 fuel is supplied from the fuel tank 56 via an injection line E, and which high-pressure injectors 50 supply excess fuel back to the fuel tank 56 via the fuel return line 54 in the direction R.

Figure 4A:
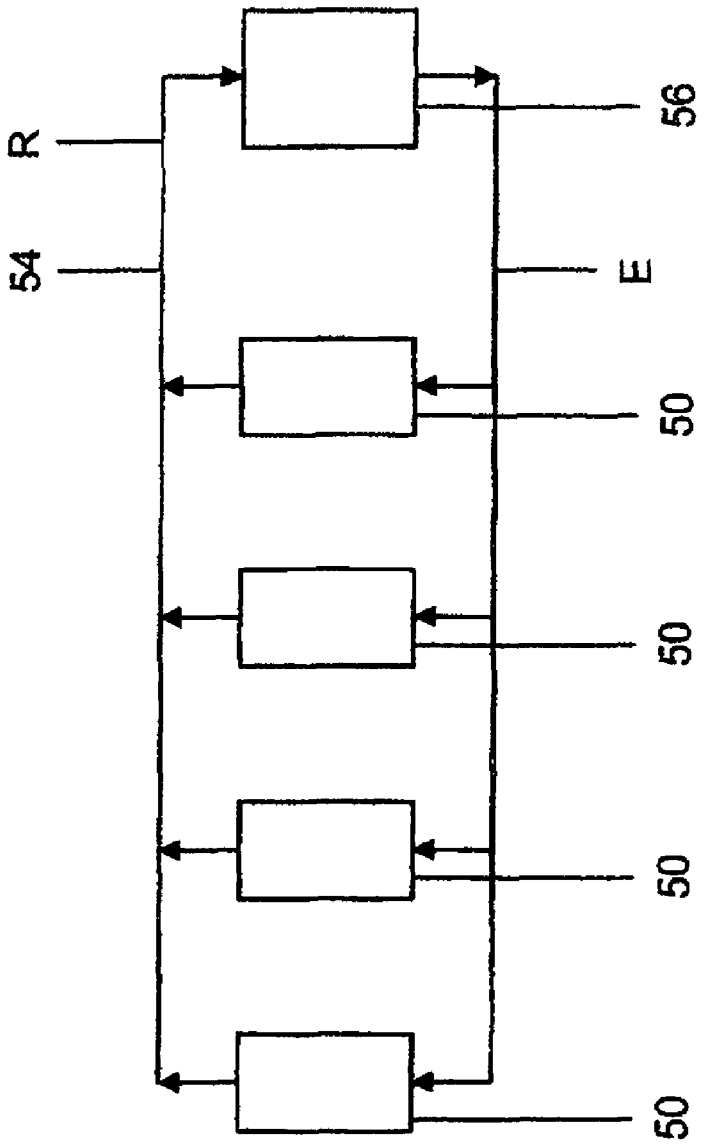
FIGS. 4*a* to *c* show a highly schematized diagrammatic illustration of four high-pressure injectors of a 4-cylinder unit with a fuel circuit in the normal operating state (FIG. 4*a*), in the operating state during testing of one injector (FIG. 4*b*) and in the operating state during testing of all four injectors (FIG. 4*c*).

FIG. 4*a* shows, in a highly schematized fashion, the normal operating state, without a more detailed illustration of the control, regulating and feed units required for the operation of the engine unit.

Figure 4B:
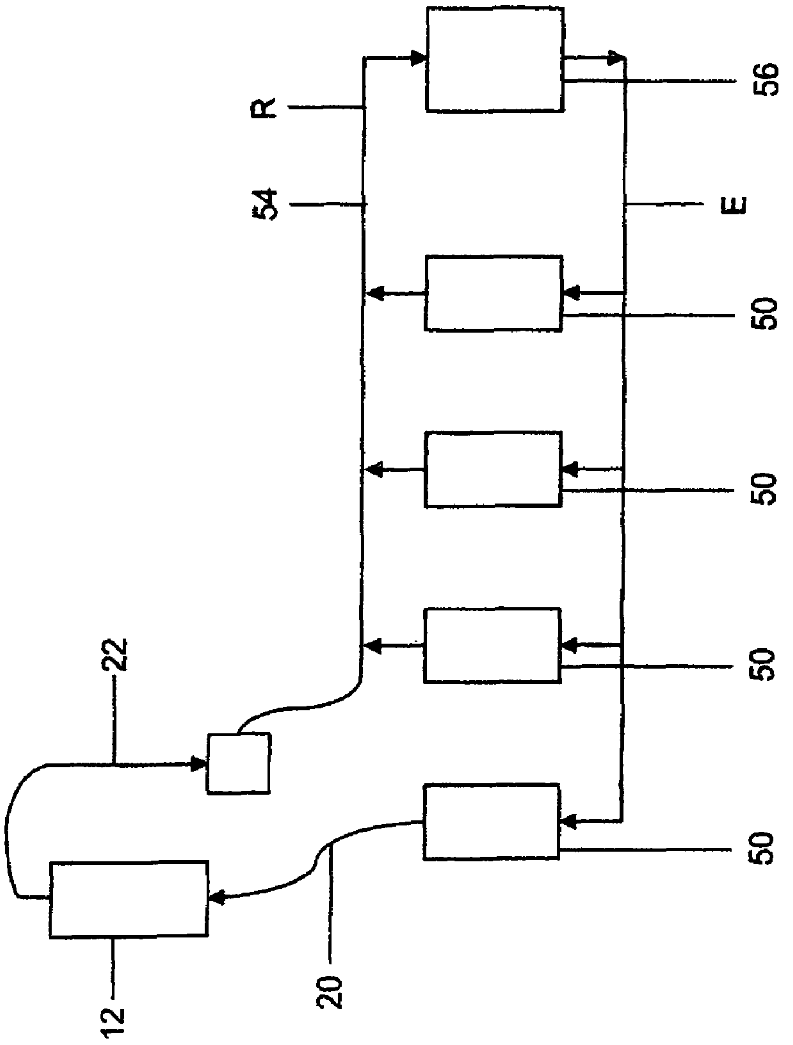

FIG. 4*b* illustrates the state in which the left-hand high-pressure injector 50 is tested. Here, the first flexible hose unit 20 is connected by means of the fuel return connection 52 of the high-pressure injector 50, which first flexible hose unit 20 is in turn connected to the throughflow quantity measuring/display unit 12. The throughflow quantity measuring/display unit 12 is in turn connected by means of a second flexible hose unit 22 to the return line 54, so that a fuel circuit is again given overall in connection with the supply of the fuel in the injection direction E. In the event of faults of the corresponding high-pressure injector 50, a greater fuel quantity than in the normal operating state flows back, and this is measured and displayed by means of the throughflow quantity measuring/display unit 12.

Figure 4C:
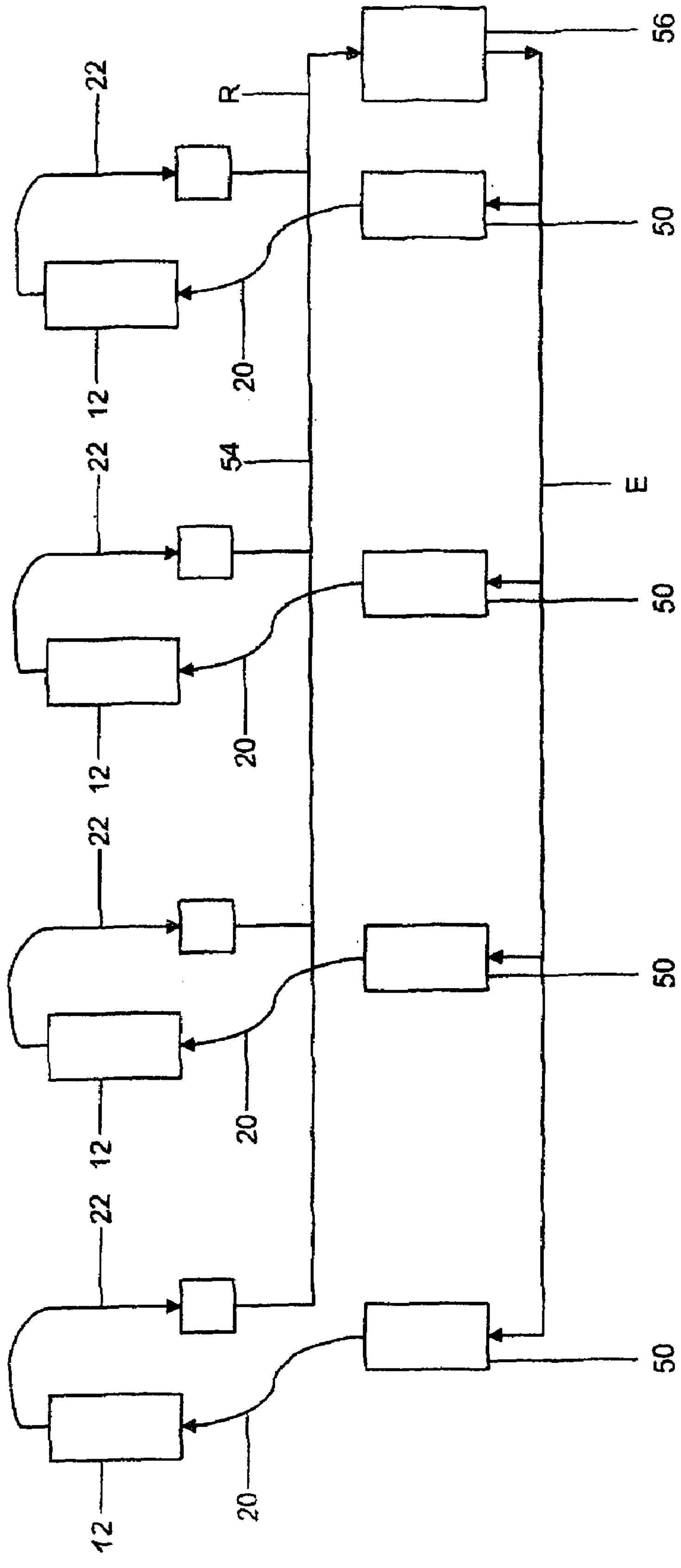

FIG. 4*c* illustrates the state in which all four high-pressure injectors 50 are tested by means of the throughflow quantity measuring/display unit 12, with each high-pressure injector 50 in connection with the throughflow quantity measuring/display unit 12 being arranged within a fuel circuit.

The invention claimed is:

1. A testing device for high-pressure injectors of a common rail injection system of an engine unit, comprising:
- high-pressure injectors each having a fuel return connection for a fuel return line, and
- a throughflow quantity measuring/display unit which can be detachably connected between the fuel return connection and fuel return line, wherein for every high-pressure injector of the engine there is available one throughflow quantity measuring/display unit,
- a first flexible hose unit that is arranged between the fuel return connection and the throughflow quantity measuring/display unit, and
- a second flexible hose unit that is arranged between the throughflow quantity measuring/display unit and the fuel return line,
- wherein every high-pressure injector in the engine unit is connected to a throughflow quantity measuring/display unit such that defects of each high-pressure injector within an overall fuel circuit can be measured based on the flow quantity of fuel in the return line of each high-pressure injector.

2. The testing device as claimed in claim 1,
- wherein a separate display unit is connected to the throughflow quantity measuring/display unit.

3. The testing device as claimed in claim 1,
- wherein the throughflow quantity measuring/display unit has a digital or pointer display unit.

4. The testing device as claimed in claim 1,
- wherein the throughflow quantity measuring/display unit is embodied as a transparent hollow profile with a floating body arranged at the inside so as to be movable in the longitudinal direction of the hollow profile.

5. The testing device as claimed in claim 4, wherein the hollow profile is composed of glass or plastic.

6. The testing device as claimed in claim 5, wherein the hollow profile has a readable scale.

7. The testing device as claimed in claim 4, wherein the hollow profile has a readable scale.

8. A method for testing the functionality of high-pressure injectors of a common rail injection system of an engine unit, comprising the steps of:
- detachably inserting, for a predefinable time interval, a throughflow quantity measuring/display unit between a fuel return connection of the high-pressure fuel injector and a fuel return line,
- subsequently operating the engine unit over predefinable time intervals, so that the quantity of returning fuel is measured and/or displayed,
- in each case using one throughflow quantity measuring/display unit within the predefinable time interval for each high-pressure injector of the engine unit,
- arranging a first flexible hose unit between the fuel return connection and the throughflow quantity measuring/display unit, and
- arranging a second flexible hose unit between the throughflow quantity measuring/display unit and the fuel return line,
- wherein every high-pressure injector in the engine unit is connected to a throughflow quantity measuring/display unit such that defects of each high-pressure injector within an overall fuel circuit can be measured based on the flow quantity of fuel in the return line of each high-pressure injector.

9. The method as claimed in claim 8, further including the step of:
- detachably connecting said first and second flexible hose units in order to produce a communicative connection between the fuel return connection of the high-pressure injector and the throughflow quantity measuring/display unit and/or between the throughflow quantity measuring/display unit and the fuel return line.

10. The method as claimed in claim 8 or 9, further including the steps of:
- using the throughflow quantity measuring/display unit in a first time interval,
- subsequently subjecting the high-pressure injectors to a cleaning process, and then
- using the throughflow quantity measuring/display unit in a second time interval.

* * * * *